United States Patent
Miefalk

[11] Patent Number: 6,058,879
[45] Date of Patent: May 9, 2000

[54] TEATCUP

[75] Inventor: Håkan Sven Uno Miefalk, Järfälla, Sweden

[73] Assignee: Alfa Laval Agri AB, Tumba, Sweden

[21] Appl. No.: 09/142,955

[22] PCT Filed: Mar. 21, 1997

[86] PCT No.: PCT/SE97/00491

§ 371 Date: Sep. 16, 1998

§ 102(e) Date: Sep. 16, 1998

[87] PCT Pub. No.: WO97/35469

PCT Pub. Date: Oct. 20, 1997

[30] Foreign Application Priority Data

Mar. 27, 1996 [SE] Sweden .................................. 9601180

[51] Int. Cl.[7] .................................................. A01J 5/04
[52] U.S. Cl. ........................... 119/14.47; 119/14.48; 119/14.49
[58] Field of Search .................... 119/14.47, 14.48, 119/14.49, 14.1

[56] References Cited

U.S. PATENT DOCUMENTS

| | | |
|---|---|---|
| 1,477,978 | 4/1923 | Sabroe . |
| 1,507,630 | 9/1924 | Sundberg . |
| 2,986,117 | 5/1961 | Ronaldson . |
| 3,557,755 | 1/1971 | Close . |
| 4,481,906 | 11/1984 | Steingraber et al. . |
| 4,936,254 | 6/1990 | Marshall ................. 119/14.47 |
| 5,007,378 | 4/1991 | Larson ..................... 119/14.47 |

FOREIGN PATENT DOCUMENTS

| | | |
|---|---|---|
| 16002 | 6/1912 | Denmark . |
| 88580 | 3/1983 | European Pat. Off. . |
| 566977 | 4/1993 | European Pat. Off. . |
| 645079 | 9/1994 | European Pat. Off. . |
| 1202068 | 8/1985 | Italy . |
| 42924 | 4/1916 | Sweden . |
| 159259 | 9/1955 | Sweden . |
| 737834 | 10/1953 | United Kingdom . |

*Primary Examiner*—Peter M. Poon
*Assistant Examiner*—Yvonne Abbott
*Attorney, Agent, or Firm*—Hovey, Williams, Timmons & Collins

[57] ABSTRACT

A teatcup (1) comprises a shell (2), a tubular teatcup liner extending in the shell and a valve housing (4) having a connection pipe connectable to an end (11) of the teatcup liner, a valve housing (4) being arranged to be mounted to the shell (2). The valve housing and the shell comprise locking members (21, 22), which are arranged to engage each other disconnectably during said mounting in order to lock the valve housing to the shell.

18 Claims, 3 Drawing Sheets

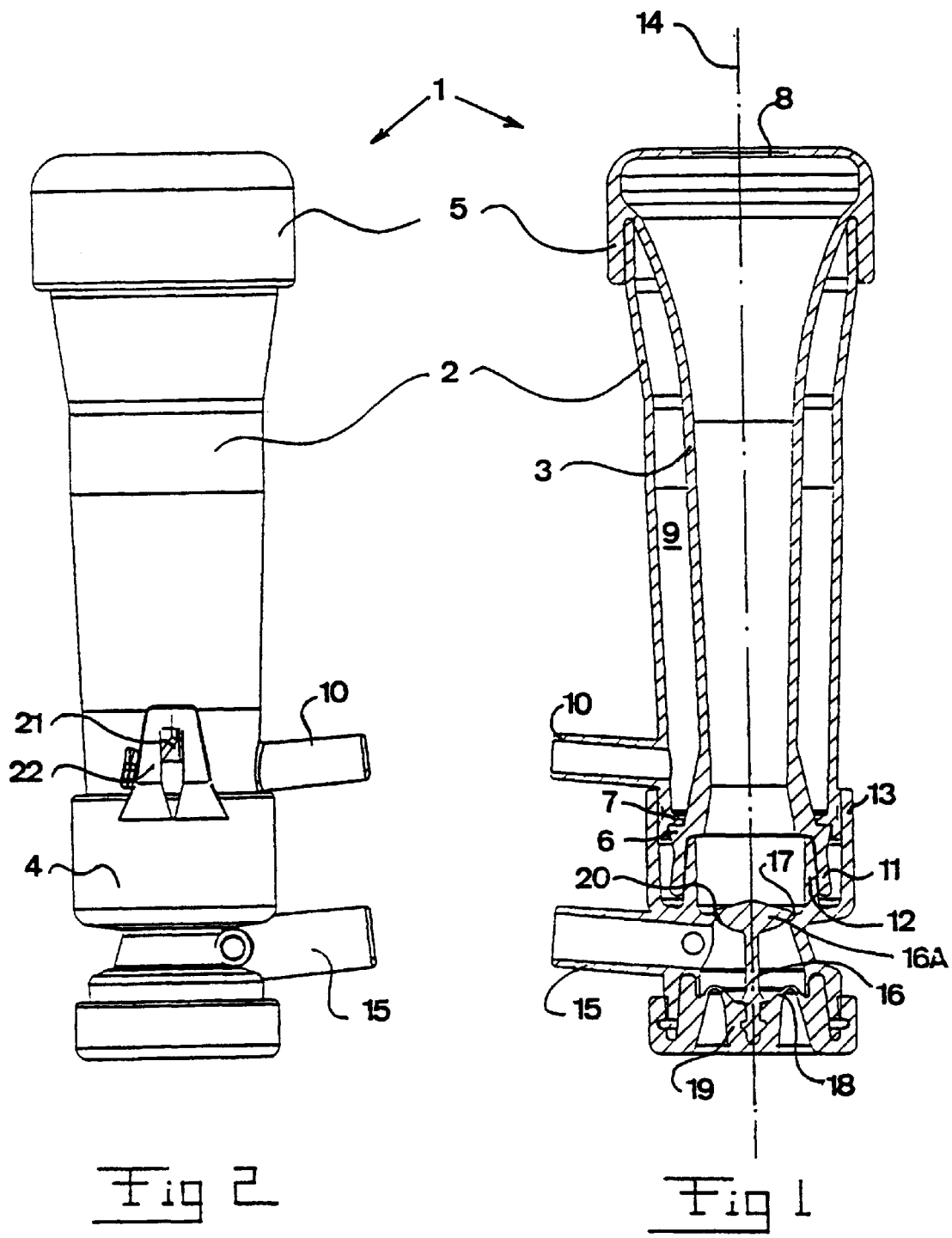

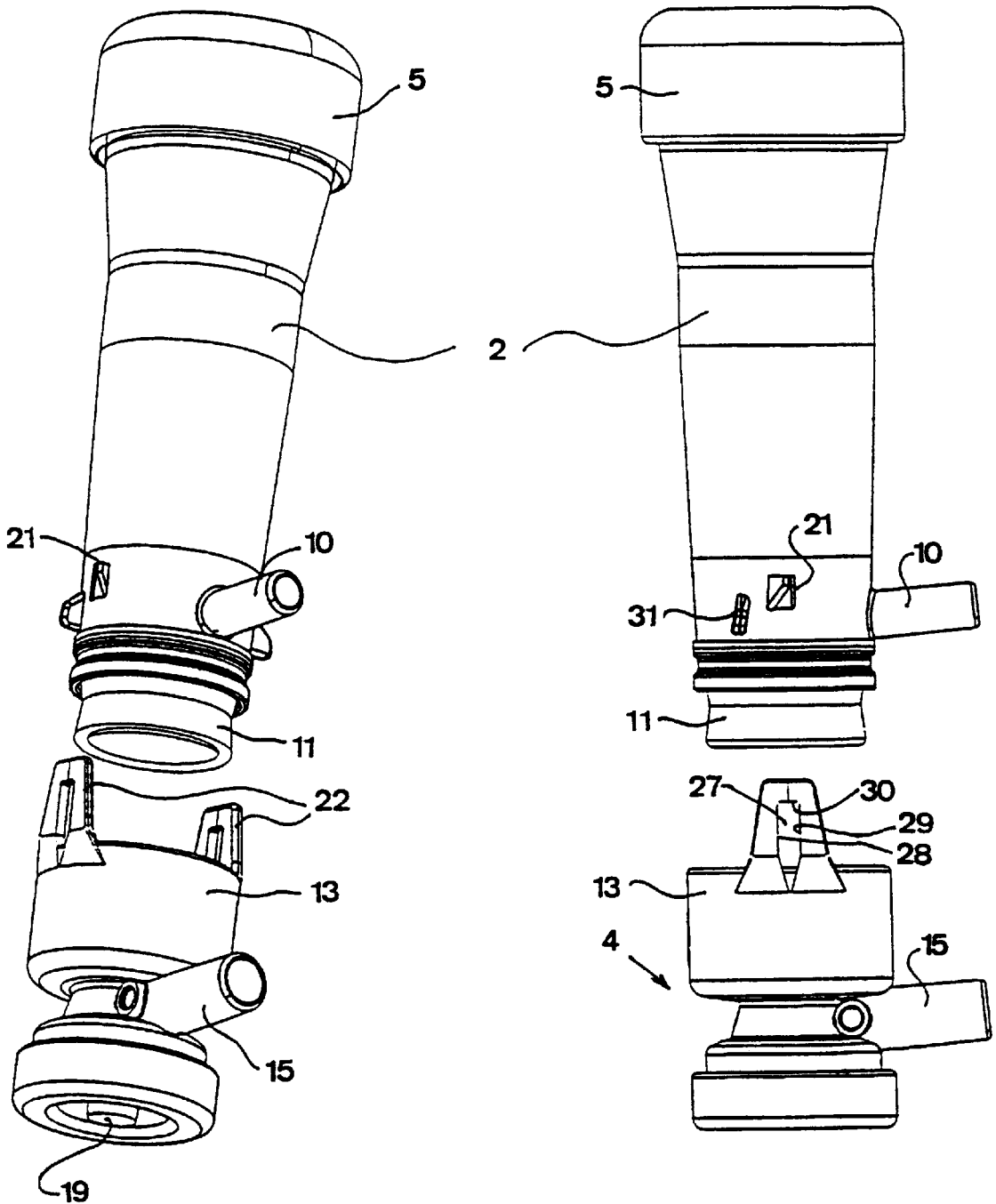

TEATCUP

BACKGROUND OF THE INVENTION

1. Field of Invention

The present invention comprises a teatcup comprising a shell, a tubular teatcup liner extending in the shell, and a valve housing having a connection pipe connectable to an end of the teatcup liner, the valve housing being arranged to be mounted to the shell and the connection pipe being arranged to be inserted into said end of the tubular teatcup liner, the valve housing and the shell comprising locking members arranged to engage each other disconnectably during said mounting in order to lock the valve housing to the shell.

2. Description of the Prior Art

A known milking machine comprises a number of teatcups to be applied to a respective teat of an animal to be milked. Usually, such a teatcup comprises an outer rigid shell and a tubular teatcup liner extending in the shell. When the teatcup is applied to a teat of an animal to be milked, the inner wall of the tubular teatcup liner will thus abut the teat. Since the teatcup liners shall provide a pulsating pressure against the teat they must be elastic. Every elastic material, at least such which are available today, is subjected to a deterioration of the elastic capacity over the time and by use. Although the shell of the teatcup has a very long lifetime, the teatcup liners are thus an article of consumption which has to be replaced within equal time intervalls. Thereby, a teatcup liner to be replaced has to be removed from the shell of the teatcup and a new teatcup liner has to be mounted in the shell. Teatcups known do not function in a satisfactorily manner in this respect and this operation of replacement is difficult and time consuming. In addition, it happens that the teatcup liner is not always mounted in a proper position in the shell, which means that the teatcup will not function in a optimal manner during the milking operation.

With regard to teatcups for milking of in the first place smaller animals, such as sheep, goats etc., having merely two teats, there is normally no claw for collecting the milk from the different teatcups before the milk is conducted further to a milk receiving member of the milking machine but instead the milk is conducted from each teatcup directly to the milk receiving member of the milking machine. This means, that a valve housing having a closing valve, closing the milk conduit and preventing air rush when the teatcup is not attached to a teat, has to be provided in connection to each teatcup.

IT-A-1 202 068 discloses a teatcup intended for milking of goats and sheep and comprising a shell, a tubular teatcup liner extending in the shell and valve housing having a connection pipe connectable to one end of the teatcup liner. The lower end of the teatcup liner extends out of the shell and is adapted to receive the connection pipe of the valve housing therein. The teatcup lacks any connection members between the valve housing and the shell, but instead the connection therebetween is provided merely by means of the application of the teatcup liner onto the connection pipe of the valve housing. In order to make such a connection sufficiently strong the lower end of the teatcup liner has to be pressed against the outer surface of the connection pipe by a relatively strong elastic force. By such a mounting method it is difficult to demount and once again mount the valve housing to the other parts. In addition, there is a great risk that the lower end of the teatcup liner will jam to the connection pipe over time due to the milk substances penetrating the joint therebetween. A further disadvantage of this teatcup is the relatively long height which, especially during milking of smaller animals having a small distance between the ground and the teats, may render the application of the teatcups more difficult and obstruct a free milk flow. This document also discloses a membrane controlled closing valve in the valve housing. Moreover, this valve comprises a cam member manually rotatable in order to ensure forcibly that it is kept in the open position.

EP-B-88 580 discloses a similar teatcup having a shell and a teatcup liner provided in the shell and having a lower end extending out from the shell and being configured in such a manner that it forms a valve housing. Thus, since the valve housing is an integrated part of the teatcup liner this has a rather complicated configuration which is not desirable in view of the fact that the teatcup liner is an article of consumption.

U.S. Pat. No. 2,986,117 discloses another teatcup having a shell and a teatcup liner extending in the shell and having a lower end bent outwardly around the outer surface of the shell. The teatcup has no locking member between the shell and the valve housing, but instead the shell with the teatcup liner provided thereon is inserted in a tubular upper end of a valve housing being manufactured in a transparent material and in such a manner that the shell and the teatcup liner are clamped in the valve housing. Thus, the teatcup liner will be clamped between the shell and the valve housing. Such a construction requires, in order to be reliable, a large elastic clamping force between the different parts, which, however, results in a difficult mounting and demounting of the parts. By such a construction there is also a great risk that the teatcup liner is turned during the mounting, which may result in folds on the teatcup liner and thus to a deteriorated function thereof.

GB-A-737 834 discloses a similar teatcup having a shell and a teatcup liner extending in the shell and having a lower end being bent outwardly around the outer surface of the shell. The shell and the teatcup liner so provided are inserted in a tubular upper end of a valve housing and in such a manner that the shell and the teatcup liner are clamped in the valve housing.

EP-A-645 079 discloses a teatcup as initially defined. The valve housing comprises a connection pipe which is inserted into a tubular lower end of the teatcup liner. It appears that the valve housing is connected to the shell by means of a thread connection. Thus it is necessary to rotate the valve housing in relation to the shell for mounting the teatcup. This means that there is a great risk that the teatcup liner will be twisted during the mounting process. Such twisting may lead to folds on the teatcup liner and consequently a proper function of the teatcup may not be guaranteed.

SUMMARY OF THE INVENTION

The object of the present invention is to remedy the problems mentioned above and to provide a teatcup which in a quick and simple manner may be demounted and mounted.

This object is obtained by the teatcup initially defined and characterized in that the locking members are arranged to provide the locking of the shell to the valve housing during said mounting by means of a translational relative movement between the shell and the valve housing. By such a teatcup having a valve housing arranged to be mounted directly to a shell and separate locking members of the housing and the shell, a simple and quick mounting and demounting of the teatcup is enabled in such a manner that a teatcup liner located therein rapidly may be replaced. By such mounting method no forces will act on the connection between the teatcup liner and the connection pipe, and thus the teatcup liner merely needs to abut the connection pipe in such a manner that a sealed connection is obtained. Because of the translational relative movement no rotation of the teatcup liner will take place and thus there will be no folds on the teatcup liner. Consequently, a proper function of the teatcup is ensured.

According to an embodiment of the invention, the locking members are arranged to be disconnectable from each other by means of a rotational relative movement between the shell and the valve housing. Possible folds which may be arise during such a loosening rotating movement have of course no negative influence on the function of the teacup. However, such a relative movement is advantageous in such a manner that if the different parts have jammed, due to a long time of use or due to possible milk residues and the like, which may have penetrated the joint between different parts, more power for the demounting is obtained by a rotational relative movement.

According to a further embodiment of the invention, the valve housing comprises a tubular connection portion which is arranged in such a manner that the shell is insertable therein. Advantageously, the tubular connection portion is arranged on a distance from and in such manner that it surrounds the connection pipe, and preferably concentric to the connection pipe. Thereby, the locking member of the valve housing may be provided on the connection pipe and the locking member of the shell may be provided on the outer surface of the shell.

According to a further embodiment, the locking member of the shell comprises at least one locking projection projecting from the outer surface of the shell and the locking member of the valve housing comprises at least one ring-shaped gripping member arranged to engage the locking projection when the shell and the valve housing are mounted to each other. Preferably, a first ramp surface is provided on one of the locking projection and the gripping member and arranged to permit the sliding of the locking projection and the gripping member against each other during said translational movement. Thereby, the first ramp surface may form an angle to a radial plane of the shell. Furthermore, a second ramp surface may be provided on one of the locking projection and the gripping member and arranged to permit the sliding of the locking projection and the gripping member against each other during said rotational movement. Thereby, the second ramp surface may form an angle to an axial plane through the shell.

According to a further embodiment, the teatcup liner comprises fixing members arranged to engage co-operating fixing members of the shell in order to fixedly hold the teatcup liner in a proper position in the shell. By such fixing members, it is prevented that the teatcup liner may move within the shell during the mounting and simultaneously the insertion of the connection pipe into the open end of the tubular teatcup liner is facilitated. Advantageously, the fixing member of the shell comprises a shoulder projecting radially inwardly and the fixing member of the teatcup liner comprises a shoulder projecting radially outwardly.

According to a further embodiment of the invention, the valve housing comprises an outlet member, arranged to enable a connection between the inner space of the teatcup liner and a milking machine, and a valve located in the connection pipe and arranged to open said connection when the teatcup is attached to a teat of an animal and close said connection when the teatcup is not attached to a teat.

Because of the fact that the valve is configured in such a manner that it is located in the connection pipe the height of the teatcup may be relatively low. Thereby, the valve may advantageously comprise a valve body and a valve seat provided in the connection pipe. Furthermore, the valve may be connected to a membrane, one surface of which is facing the inner space of the valve housing and an other surface of which is facing the environment. By making the area of the surface of the membrane facing the environment smaller than the opening area of the valve seat, it is ensured that if the pressure in the inner space of the teatcup liner sinks below a predetermined level in relation to the pressure of the environment the valve body will move from the valve seat and into a position opening said connection. Furthermore, by such a configuration the valve will close said connection when the teatcup is released from a teat and the pressure of the environment will be established within the inner space of the teatcup liner. Due to this area relation the position of the valve is determined in the first place by the pressure difference between the environment and the inner space of the teatcup liner and the valve housing, respectively. Preferably, the membrane may, however, be resiliently configured and arranged to bias the valve to said closed position. This biasing force is preferably of such an order that it may close the valve merely when the pressure in the inner space of the teatcup liner and the valve housing is equal to the pressure of the environment. Furthermore, the valve may comprise a leakage passage which is dimensioned in such a manner that it enables a pressure equalization between the inner space of the teatcup liner and the inner space of the valve housing when the teatcup has been attached to a teat.

BRIEF DESCRIPTION OF THE DRAWINGS

The present invention shall now be explained more closely by means of an embodiment, disclosed as an example, and with reference to the drawings attached hereto.

FIG. 1 discloses a longitudinal section through a teatcup according the invention.

FIG. 2 discloses a sideview of the teatcup in FIG. 1 in a mounted condition.

FIG. 3 discloses a sideview of a teatcup in FIG. 1, the valve housing being removed.

FIG. 4 discloses a view obliquely from below of the teatcup in FIG. 1, the valve housing being removed.

DETAILED DESCRIPTION OF DIFFERENT EMBODIMENTS

Figure 5:
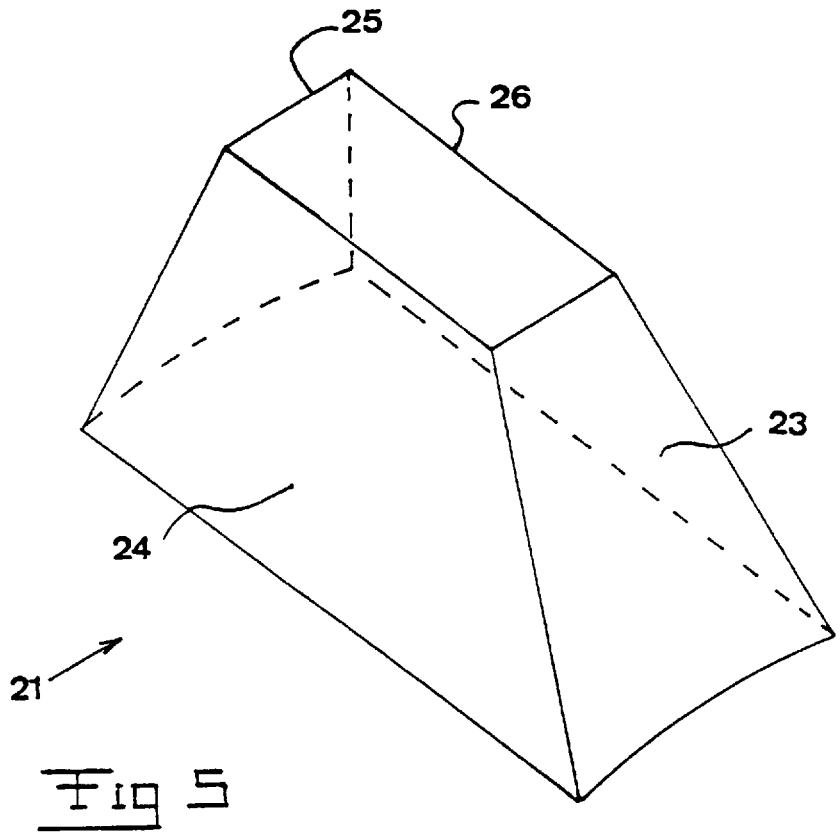
FIG. 5 discloses an enlarged view of a locking member of the teatcup according to the invention.

With reference to FIGS. 1–4, there is disclosed a teatcup 1 having a rigid outer shell 2, a tubular teatcup liner 3 extending in the shell 2 and a valve housing 4 mounted to the lower end of the shell 2. The teatcup liner 3 has an upper collar 5 arranged to abut the outer surface of the shell 2. The lower part of the teatcup liner 3 comprises a circumferential shoulder 6 projecting radially outwardly and arranged to abut a surrounding shoulder 7 projecting radially inwardly and provided on the inner surface of the shell 2. As is disclosed in FIG. 1 the teatcup liner 3 is thus fixedly held in a fixed position in the shell 2 by means of the collar 5 and the shoulder 6 projecting radially outwardly. Furthermore, the teatcup liner 3 has a passage 8 provided in the upper part for the application of the teatcup 1 to a teat. When the teatcup liner 3 is mounted in the shell 2 in the manner disclosed, there is formed a closed pulsation chamber 9 between the teatcup liner 3 and the shell 2. The pulsation chamber 9 may be connected to a pulsator of a milking machine (not disclosed) via a nipple 10. Below the shoulder 6 projecting radially outwardly the teatcup liner 3 has a tubular end portion 11 which is intended to sealingly receive a connection pipe 12 of the valve housing 4. In order to facilitate the insertion of the connection pipe 12 into the tubular end portion 11, the connection pipe 12 may have a slightly conical outer surface, see FIG. 1. Also the tubular end portion 11 may have a shape being slightly conical in such a manner that it widens outwardly. Furthermore, the valve housing 4 has a tubular connection portion 13 having such an inner diameter that the lower end of the shell 2 may be inserted therein.

The teatcup 1 has a longitudinal center axis 14. In the mounted condition the shell 2, the teatcup liner 3, the connection pipe 12 and the connection portion 13 are all essentially concentrically provided with respect to the center axis 14.

The valve housing 4 comprises an outlet nipple 15 and a valve 16 having a valve body 16A being located in the connection pipe 12 and being arranged to be biased against a valve seat 17. The biasing force is obtained by means of a membrane 18 provided to close off the lower end of the valve housing 4. The membrane 18 has a thickened portion 19 which is centrically provided and to which the valve 16 is attached. The membrane 18 is resilient and provides a slight biasing force to the valve body 16A in a closing direction against the valve seat 17. The membrane 18 has a first surface which faces the inner space of the valve housing 4 and second surface which faces outwardly against the environment. The membrane 18 is dimensioned in such a manner that the area of the active membrane surface facing the environment is less than the opening area of the valve seat 17. Furthermore, there is a leakage passage 20 between the valve body 16A and the valve seat 17 which is dimensioned in such a manner that when the valve body 16A is located in the closed position a pressure equalization may be established between the inner space of the teatcup liner 3 and the inner space of the valve housing 4 when the teatcup 1, via the outlet nipple 15, has been connected to a vacuum pump of a milking machine and has been attached to a teat. Consequently, the valve 16 functions in such a manner that when the pressure of the environment prevails in the inner space of the teatcup liner 3 and in the inner space of the valve housing 4 the spring force of the membrane 18 will be sufficient for keeping the valve body 16A in a closed position against the valve seat 17. When a vacuum is transferred through the outlet nipple 15, the pressure in the inner space of the valve housing 4 will decrease. Since the area of the valve body 16 facing the inner space of the teatcup liner 3, where the pressure of the environment still prevails, is larger than the outwardly facing area of the membrane 18 the force of the pressure of the environment will act on the valve in a closing direction, i.e. the valve body 16A is pressed against the valve seat 17. When the teatcup 1 is attached to a teat the pressure in the inner space of the teatcup liner 3 will decrease due to the leakage passage 20 and thus the pressure of the environment will act on the outwardly facing surface of the membrane 18 in such a member that the membrane is pressed inwardly in the valve housing 4 and consequently lifting the valve body 16A from the valve seat 17.

The shell 2 and the valve housing 4 comprises locking members 21, 22 which are arranged to engage each other when the shell 2 is introduced in the tubular connection portion 13 of the valve housing 4. The locking members 21, 22 comprise two locking projections 21, which are essentially diametrically provided on the outer surface of the shell 2, and two ring-shaped gripping members 22 which are essentially diametrically provided on the connection portion 13 in such a manner that they extend upwardly beyond the upper edge of the connection portion 13. As is disclosed in FIG. 5, each locking projection 21 comprises a first ramp surface 23 which is inclined in relation to the center axis 14 in such a manner that it forms an angle to a radial plane through the shell 2. This means that the first ramp surface 23 forms an acute angle together with the center axis 14 in an axial plane with respect to the center axis 14. Furthermore, each locking projection 21 comprises a second ramp surface 24 forming an angle to an axial plane through the shell 2. This means that the second ramp surface 24 is parallel to the center axis in an axial plane with respect to the center axis and forms, in the example disclosed, an acute angle with the tangential plane of the shell 2 in the intersectional line between the second ramp surface 24 and the outer surface of the shell 2. It should be noted that this acute angle may be equal to zero, i.e. that the second ramp surface 24 is formed by a tangential plane to the shell 2. Seen from above, i.e. as is disclosed in FIGS. 2 and 3, the locking projection 21 is shaped as a tetragon and the surface 25 which is opposite to the first ramp surface 23 is comprised in a plane to which the center axis 14 forms the normal. The surface 26 which is opposite to the second ramp surface 24 is comprised in an essentially radial plane with respect to the center axis 14. The ring-shaped gripping member 22 is resiliently shaped and has a passage 27 provided in the center, see FIG. 3. The passage 27 has two edge surfaces 28, 29, which are parallel to each other and are comprised in an essentially radial plane with respect to the center axis 14. In addition, the passage 27 has an upper edge side 30 which is comprised in a plane to which the center axis 14 essentially forms the normal. Furthermore, there are two diametrically opposite stop members 31 which are provided on the outer surface of the shell 2.

Figure 6:
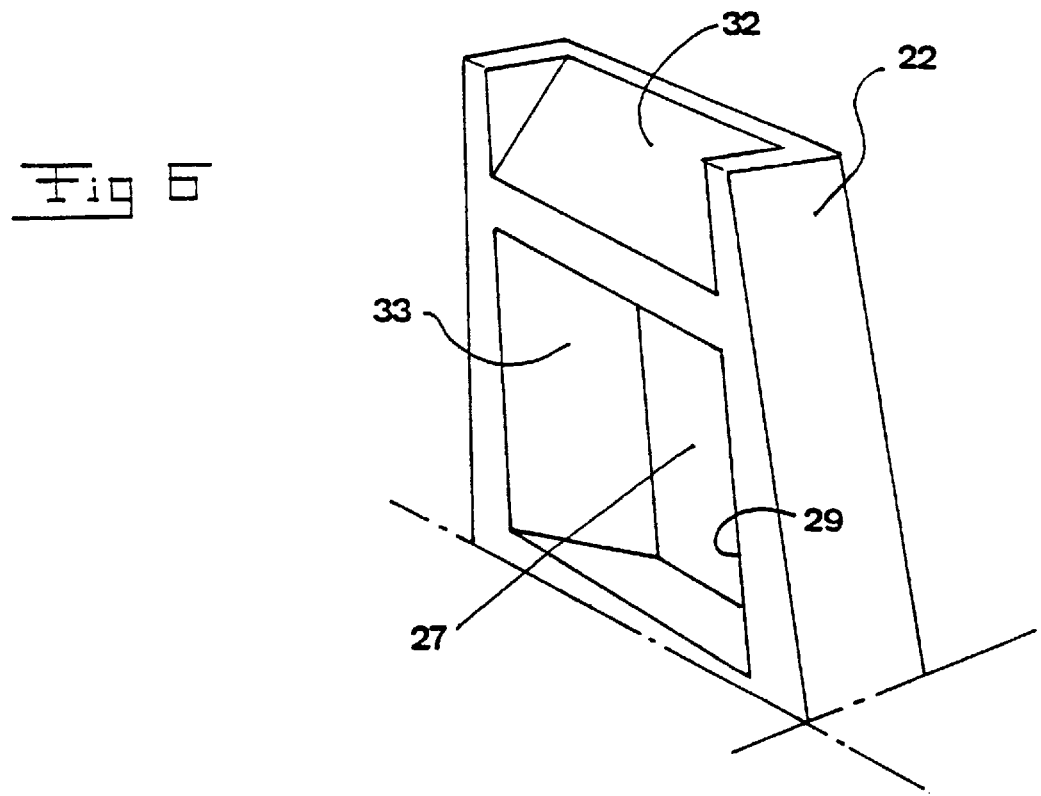
FIG. 6 discloses an enlarged view of a second embodiment of a gripping member of the teatcup according to the invention.

According to a second alternative embodiment, the first and second ramp surfaces are provided on the gripping member 22 instead of being provided on the locking projection 21. Such a gripping member 22 is disclosed in FIG. 6 and has a first ramp surface 32, which in a mounted condition forms an angle to a radial plane through the shell 2, i.e. it forms an acute angle to the center axis 14 in an axial plane with respect to the center axis 14, and a second ramp surface 33, which in a mounted condition forms an angle to an axial plane through the shell 2, i.e. it is essentially parallel to the center axis 14 in an axial plane with respect to the center axis 14. It is also possible to provide one of the first and second ramp surfaces on the locking projection 21 and another one of the first and second ramp surfaces on the gripping member 22.

When the teatcup 1 is to be mounted a teatcup liner 3 is introduced into the upper end of the shell 2 and displaced downwardly in such a manner that the shoulder 6 having a downwardly facing inclined conical surface slides over an upwardly facing conical surface of the shoulder 7. Thereby, an essentially plane surface of each of the shoulders 6 and 7 will abut each other in a common plane to which the center axis 14 essentially forms the normal. Thereafter, the shell 2 together with the teatcup liner 3 is displaced by a translational, rectilinear movement into the connection portion 13 of a valve housing 4. The translational movement extends in a direction essentially parallel to the center axis 14. This means that the end portion 11 of the teat cup liner 3 will be pushed onto the connection pipe 12 of the valve housing 4 and the outer surface of the shell 2 will slide on the inner surface of the connection portion 13. Simultaneously, the two gripping members 22 will be displaced via the surfaces 23, 32 over the locking projections 21 until the edge surface 30 has passed the locking projection 21 and snaps down onto the upper surface 25 of the locking projection 21. In this position, the valve housing 4 may not be pulled away from the shell 2 since the edge surface 30 will abut the edge surface 25. In order to demount the teatcup 1, the valve housing 4 is rotated in relation to the shell 2 about the center axis 14 in such a manner that the gripping member 22 via the surfaces 24, 33 will slide onto and over the locking projection 21. When the gripping member 22 has passed over the locking projection 21 the valve housing 4 may in an easy manner be pulled off the shell 2. The stop member 31 guides the gripping member 22 in such a manner that it is moved onto an locking projection 22 in a proper position and makes a rotation of the valve housing 4 in relation to the shell 2 in the wrong direction impossible.

The teatcup according to the invention is not limited to the embodiment disclosed above but may be modified and varied within the scope of the following claims. The teatcup disclosed is appropriate in the first place for milking of smaller animals, such as sheep and goats, where no claw usually is utilised. However, the teatcup may also advantageously be used for larger animals, such as for example cows, buffaloes and horses.

I claim:

1. A teatcup comprising:
    a shell;
    a tubular teatcup liner extending into the shell and having an end; and
    a valve housing having a connection pipe connectable to said end of the teatcup liner, the valve housing being arranged to be mounted to the shell and the connection pipe being arranged to be inserted into said end of the tubular teatcup liner, the valve housing and the shell comprising locking members arranged to engage each other disconnectably during said mounting in order to lock the valve housing to the shell, wherein the locking members are arranged to provide the locking of the shell to the valve housing during said mounting by means of a translational relative movement between the shell and the valve housing.

2. A teatcup according to claim 1, wherein the locking members are arranged to be disconnectable from each other by means of a rotational relative movement between the shell and the valve housing.

3. A teatcup according to claim 1, wherein the valve housing comprises a tubular connection portion which is configured in such a manner that the shell is insertable therein.

4. A teatcup according to claim 3, wherein the tubular connection portion is provided at a distance from and in such a manner that it surrounds the connection pipe, and is concentric to the connection pipe.

5. A teatcup according to claim 3, wherein the shell has an outer surface, the locking member of the valve housing is provided on the connection portion and that the locking member of the shell is provided on the outer surface of the shell.

6. A teatcup according to claim 5, wherein the locking member of the shell comprises at least one locking projection projecting from the outer surface of the shell and that the locking member of the valve housing comprises at least one ring-shaped gripping member arranged to engage the locking projection when the shell and the valve housing are mounted to each other.

7. A teatcup according to claim 6, including a first ramp surface provided on one of the locking projection and the gripping member and arranged to permit the sliding of the locking projection and the gripping member against each other during said translational movement.

8. A teatcup according to claim 7, wherein the first ramp surface forms an angle to a radial plane of the shell.

9. A teatcup according to claim 7, including a second ramp surface provided on one of the locking projection and the gripping member and arranged to permit the sliding of the locking projection and the gripping member against each other during said rotational movement.

10. A teatcup according to claim 9, wherein the second ramp surface forms an angle to an axial plane through the shell.

11. A teatcup according to claim 1, wherein the teatcup liner comprises fixing members arranged to engage co-operating fixing members of the shell in order to fixedly hold the teatcup liner in a proper position in the shell.

12. A teatcup according to claim 11, wherein the fixing member of the shell comprises a shoulder projecting radially inwardly and that the fixing member of the teacup liner comprises a shoulder projecting radially outwardly.

13. A teatcup according to claim 1, wherein the valve housing comprises an outlet member, arranged to enable a connection between the inner space of the teatcup liner and a milking machine, and a valve located in the connection pipe and arranged to open said connection when the teatcup is attached to a teat of an animal and close said connection when the teatcup is not attached to a teat.

14. A teatcup according to claim 13, wherein the valve comprises a valve body and a valve seat provided in the connection pipe.

15. A teatcup according to claim 13, wherein the valve is connected to a membrane, one surface of which is facing the inner space of the valve housing and an other surface of which is facing the environment.

16. A teatcup according to claim 14, wherein the area of the surface of the membrane facing the environment is less than the opening area of the valve seat in such a manner that if the pressure in the inner space of the teatcup liner sinks below a predetermined level in relation to the pressure of the environment the valve body will move from the valve seat to a position opening said connection.

17. A teatcup according to claim 15, wherein the membrane is resilient and arranged to bias the valve to said closed position.

18. A teatcup according to claim 13, wherein the valve comprises a leakage passage dimensioned in such a manner that it enables a pressure equalization between the inner space of the teatcup liner and the inner space of the valve housing when the teatcup has been attached to a teat.

* * * * *